United States Patent
Schlipf et al.

(10) Patent No.: US 9,139,285 B2
(45) Date of Patent: Sep. 22, 2015

(54) WING WITH RETRACTABLE WING END PIECE

(71) Applicant: Airbus Operations GmbH, Hamburg (DE)

(72) Inventors: Bernhard Schlipf, Bremen (DE); Xavier Hue, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 40 days.

(21) Appl. No.: 13/667,558

(22) Filed: Nov. 2, 2012

(65) Prior Publication Data

US 2013/0056579 A1 Mar. 7, 2013

Related U.S. Application Data

(63) Continuation of application No. PCT/EP2011/002212, filed on May 3, 2011.

(60) Provisional application No. 61/330,614, filed on May 3, 2010.

(30) Foreign Application Priority Data

May 3, 2010 (DE) .......................... 10 2010 018 977

(51) Int. Cl.
*B64C 3/56* (2006.01)

(52) U.S. Cl.
CPC ....................................... *B64C 3/56* (2013.01)

(58) Field of Classification Search
CPC ........ Y10T 74/20; B64C 3/56; B64C 2201/102
USPC ................. 244/45 R, 49; 74/520, 469, 665 Q
See application file for complete search history.

(56) References Cited

U.S. PATENT DOCUMENTS

| | | | |
|---|---|---|---|
| 2,289,224 A | 7/1942 | Swanson | |
| 2,468,425 A | 4/1949 | Carpenter | |
| 5,201,479 A | 4/1993 | Renzelmann | |
| 5,310,138 A | 5/1994 | Fitzgibbon | |
| 6,260,799 B1 * | 7/2001 | Russ | ............................... 244/49 |

(Continued)

FOREIGN PATENT DOCUMENTS

| | | |
|---|---|---|
| GB | 533900 | 2/1941 |
| GB | 686646 | 1/1953 |
| WO | WO 2011/144298 | 11/2011 |

OTHER PUBLICATIONS

German Office Action for Application No. 10 2010 018 977.4 dated Nov. 12, 2013.
Chinese Search Report for Application No. 2011/80034127 dated Jul. 29, 2014.

(Continued)

*Primary Examiner* — Valentina Xavier
(74) *Attorney, Agent, or Firm* — Jenkins, Wilson, Taylor & Hunt, P.A.

(57) ABSTRACT

The invention relates to a wing with an extension in the wingspan direction, in the wing chord direction and in the wing thickness direction for use in an aircraft, with a retractable wing end piece. A mechanical lever system is here used, which can execute a pivoting motion of a wing end piece comprising both a rotational component and a translational component. The lever kinematics here comprises two lever arrangements, for which a respective two hinged devices are provided.

14 Claims, 12 Drawing Sheets

(56) References Cited

U.S. PATENT DOCUMENTS

2010/0019080 A1* 1/2010 Schweighart et al. .......... 244/49
2012/0292436 A1* 11/2012 Karem ............................ 244/49

OTHER PUBLICATIONS

Chinese Office Action for Application No. 2011/80034127 dated Aug. 5, 2014.

* cited by examiner

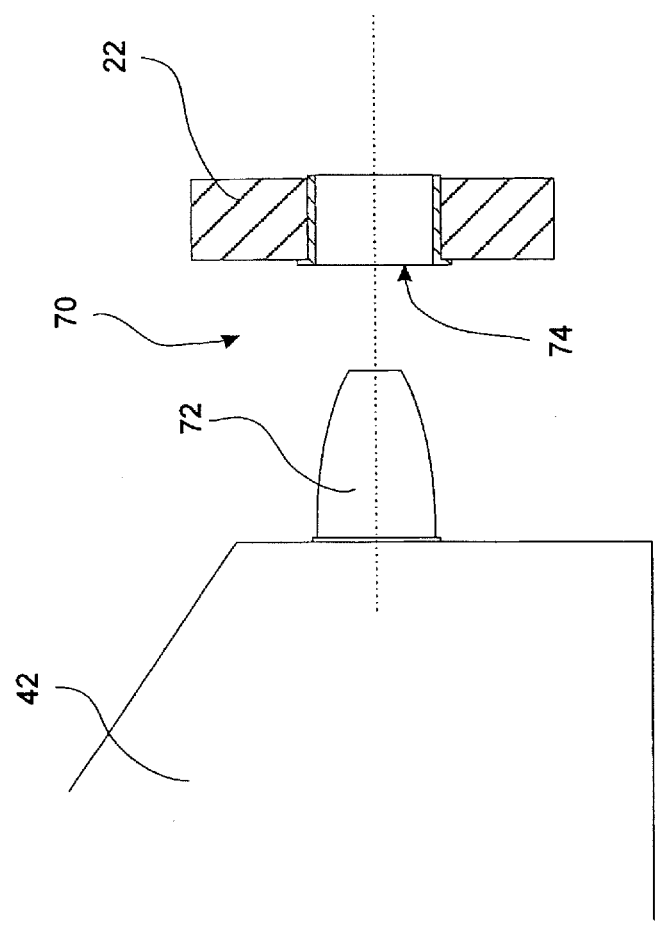

WING WITH RETRACTABLE WING END PIECE

CROSS-REFERENCE TO RELATED APPLICATIONS

This application is a continuation of and claims priority to PCT/EP2011/002212 filed May 3, 2011, which claims priority to German Patent Application No. DE 10 2010 018 977.4 filed May 3, 2010 and to U.S. Provisional Patent Application No. 61/330,614 filed May 3, 2010, the disclosures of which applications are incorporated by reference herein.

TECHNICAL FIELD

The invention relates to a wing with an extension in the wingspan direction, wing chord direction and wing thickness direction, in particular for use in an aircraft with retractable wing end piece. Use is here made of a lever mechanism, which can perform a pivoting motion of a wing end piece having both a rotation component and a translation component.

BACKGROUND

Such wings with retractable wing end pieces are known, and used, for example, in wings of aircraft transported on aircraft carriers. In order to ensure that the aircraft require as little space as possible while parking the aircraft, during so-called hangaring, the wing tips are folded up, thereby reducing the extension of the aircraft in its wingspan direction. The known systems here comprise simple flap mechanisms, for example which fold up via hinges around a single rotational axis of the wing end piece relative to the main wing in a folding motion, i.e., can be retracted. When used in an aircraft during flight, the wing end piece is folded out along this single rotational axis via the hinge in the folding motion, and brought into its flight position. Both folding processes are usually performed manually or with mechanical aids by the ground personnel, and are usually followed by a locking process after the wing end pieces have been folded out. Locking is necessary to ensure safe flight operations, in particular to prevent unintentional retraction of the wing end pieces during flight.

The disadvantage to the known systems lies precisely in the simple configuration of the folding mechanism, which requires that the folding motion be performed manually. The outlay for automating such a folding mechanism is very high, since retraction takes place over a relatively long path of the wing end piece. At least during the folding process, this yields extremely unfavorable leverage ratios, the negotiation of which necessitates that a high level of force be applied by an actuator. As a consequence, a complicated, and hence expensive, actuator would be required on the one hand, along with a reinforced configuration of the folding kinematics on the other. Aside from the higher manufacturing costs, this leads to a higher weight of the components, and hence to a lower efficiency in aircraft operation.

However, it may be advantageous or even necessary in special situational applications for the folding motion to take place automatically. In particular for both retraction and extension of the wing end piece to be performed automatically. For example, this holds true when the aim is to land large aircraft, in particular aircraft with large wingspan dimensions for load transports or intercontinental connections, at relatively small airports. While large aircraft can also land at relatively small airports depending on the length of the landing strip, small airports are often limited with respect to the maximum wingspan of the aircraft maneuvering thereupon. In addition to the widths and thickness of taxiways on the maneuvering area, attention must also be focused on the parking positions, in particular on the so-called fingers of an airport terminal. Therefore, it would basically be helpful to use foldable wing end pieces, but only in a configuration ensuring that the wing end pieces are folded out immediately as the aircraft exits the landing strip after landing, or only after it reaches the runway just before takeoff, so that the full wingspan is only established on the takeoff and landing strip.

SUMMARY

The object of the present invention is to resolve the problems of known systems described above. In particular, the object of the present invention is to provide a foldable wing end piece, especially the kinematics for this purpose, which offer the possibility of automatically pivoting a wing end piece of a wing, and thereby permit a safe stowage for individual cases and a reliable progression of forces throughout the pivoting motion.

The above object is achieved with a wing having the features of the independent claim 1. Preferred embodiments are described in the ensuing subclaims.

According to an embodiment of the invention, a wing having an extension in the wingspan direction, in the wing chord direction and in the wing thickness direction for use in an aircraft is provided, which wing comprises:
 a main wing or a main wing body with a supporting main wing structure,
 a wing end piece with a supporting wing end piece structure, and
 a lever kinematics for performing a pivoting motion of the wing end piece relative to the main wing between an extended state in which the wing end piece and the main wing form a continuous aerodynamic body and retracted state in which the wing end piece is folded inward with regard to the main wing from the extended state, the lever kinematics comprising: at least a first and a second lever arrangement, which are mounted with a respective first hinged device on the main wing structure, and with a respective second hinged device on the wing end piece structure, wherein the second hinged device of the first lever arrangement and the second hinged device of the second lever arrangement are offset in the wingspan direction of the wing end piece with regard to each other, and the first hinged device of the first lever arrangement and the second hinged device of the second lever arrangement are offset in the wingspan direction of the main wing with regard to each other.

In particular, the wing can be designed such that at least one of the first and/or second hinged devices limits the freedom of motion of the lever arrangement mounted therein to a degree of rotational freedom, so that the lever kinematics define a pivoting motion of the wing end piece relative to the main wing with a rotational and translational portion.

In the extended or aerodynamically operational state the continuous aerodynamic body formed by the wing end piece and the main wing form a wing configuration of the wing which is aerodynamically effective and which defines an operational wing configuration of the vehicle and in particular of the aircraft. The wing end piece in its extended state can be part of a complete wing in which the wing end piece at the location of its transition from the main wing prolongs the direction of the main wing at its end being located at the wing end piece.

Alternatively, the wing end piece can be a winglet which in its operational state is formed as outer extension of the main wing in order to reduce vortices at the outer end of the main wing. According to this embodiment of the invention, the winglet can be retracted, i.e. folded such that the outer part of the wing end piece moves towards the main wing structure.

In particular, the first lever arrangement according to the invention can comprise a first lever which is coupled to a first joint coupling the first lever with the main wing structure and to a third joint coupling the first lever with the main wing structure, wherein the first and third joints can be realized as rotational bearings. Further, the second lever arrangement according to the invention can in particular comprise a second lever which is coupled to a fourth joint coupling the second lever with the main wing structure and to a fifth joint coupling the second lever with the main wing structure, wherein the fourth and fifth joints can be realized as rotational bearings.

In general, a wing according to the invention extends in a wingspan direction, wing chord direction and wing thickness direction, and is advantageously used for an aircraft. The wing according to the invention can generally be an aerodynamic body on an aircraft or vehicle. In particular, the wing according to the invention can comprise a main wing with a supporting main wing structure which can comprise a main wing box for reinforcing the main wing, as well as a wing end piece realized as a component configured separately from the main wing, with a supporting wing end piece structure which can comprise a wing end piece box for reinforcing the wing end piece. The main wing structure and wing end piece structure are here comprised of components referred to as main wing box or wing end piece box, for example. As generally known, within the main wing box and/oder within the wing end piece box stringers and ribs can be connected or fixed on which the outer skin having an outer flow surface are attached. The main wing is mounted to the main body of the vehicle, i.e. the main wing is attached to the fuselage of an aircraft or to the main body of the automobile, respectively.

Also provided is a lever kinematics for performing a pivoting motion of the wing end piece relative to the main wing between an extended and retracted state of the wing end piece. These lever kinematics comprise two lever arrangements, which are mounted in a respective first hinged device in the main wing structure and in a respective second hinged device in the wing end piece structure. Therefore, two hinged devices are provided per lever arrangement. The hinged devices are here designed in such a way that the hinged devices for coupling the lever arrangements with the wing end piece structure are offset in the wingspan direction of the wing end piece, and the hinged devices for coupling the lever arrangement with the main wing structure are offset in the wingspan direction of the main wing. In addition, at least one of the first and/or second hinged devices is configured in such a way as to limit the freedom of motion of the lever arrangement mounted therein to a degree of rotational freedom, so that the lever kinematics define a pivoting process of the wing end piece relative to the main wing with a rotational and translational share.

In other words, the lever kinematics comprises four-hinge kinematics, wherein two respective hinged devices are provided on the main wing structure, and two respective hinged devices are provided on the wing end piece structure. Each of the hinged devices here defines a hinged joint between the respective lever arrangement and the respective structure, meaning the main wing structure or wing end piece structure. In this way, the main wing structure and wing end piece structure are coupled together via the lever kinematics, meaning in the broader sense via the hinged devices and lever arrangements.

In one possible case, the lever kinematics constitutes the sole connection between the main wing structure and wing end piece structure. In other words, the lever kinematics transfer all active loads arising from weight and accelerations during the pivoting process between the wing end piece structure and main wing structure in such a case. Providing two lever arrangements each having two hinged devices suitable for coupling purposes according to the invention yields the four-hinge kinematics according to the invention. Reducing the freedom of movement of the wing end piece to a single degree of rotational freedom via at least one of the hinged devices limits the relative movement, or pivoting motion, between the wing end piece and main wing to a single possible rotation.

By comparison to the known, simple folding mechanisms, the arrangement of the hinged device in respectively spaced apart positions relative to the respective wingspan direction as described in the invention defines a complex pivoting motion by comparison to the known, simple folding motions. In particular, the respective hinged devices in the main wing structure form rotational axes spaced apart from each other in the wingspan direction of the main wing, and the respective hinged devices in the wing end piece structure form rotational axes spaced part in the wingspan direction of the wing end piece. Therefore, the four-hinged devices or four-hinge-devices define a total of four rotational axes, which by interacting according to the invention, thereby yielding a coupling via the lever arrangements, result in a pivoting motion of the wing end piece that consists not exclusively of a rotational component, but rather also comprises a translational component. As a consequence, a complex pivoting motion with a rotational share and translational share can be performed, enabling an ideal distribution of forces in the lever kinematics, depending on the situational application. Varying the exact arrangement of the individual hinged devices while observing the parameters set forth in the invention makes it possible to vary the pivoting motion, and hence the leverage or force ratios during the pivoting process.

The adjustment of complex pivoting motions enabled in this way also makes it possible to adjust complex load situations over the course of the pivoting motion. This means that various load situations prevail in both the lever arrangements and hinged devices during the course of the pivoting process, depending on the leverage ratio in the respective pivoting position. These can be altered in such a way as to place less of a load on both the hinged devices and lever arrangements in terms of their mechanical stability, meaning to reduce the maximum value that is temporarily reached during the pivoting motion. What this means with regard to the overall construction of the wing is that both the lever arrangements and hinged devices can be given a simpler, especially lighter, design. In addition, the lower mechanical load during the pivoting process results in more of a long-term stability, and hence an enhanced operational reliability of a wing according to the invention.

The fact that a complex pivoting motion can be executed also makes a wing according to the invention suitable to be equipped with an automatic actuation of lever kinematics. While systems known for simple folding motions involve a load progression during the folding motion in a hinge that cannot be influenced, a wing according to the invention can be configured in such a way that the lever kinematics comprise a complex load progression adjusted to the respective actuation form during a complex progression of pivoting motions, in particular a complex progression of forces during the pivoting motion, and hence even make it possible to automatically execute the pivoting motion in an efficient manner in the first place. Therefore, a distinction must be made between a pivoting motion according to the invention and known, simple folding movements via hinges as in known systems.

The two extreme situations relating to the pivoting process according to the invention are the extended state of the wing end piece and the retracted state of the wing end piece. The "extended state" of the wing end piece here means that the wing end piece is in a position relative to the main wing where the wing is suitable for use in a flight situation.

The "retracted state" of the wing end piece here denotes that the maximum wingspan of the wing is reduced to a minimum, meaning essentially to the wingspan extension of the main wing. In the "retracted state", the wing end piece is folded inward from its extended or aerodynamically operational state. Depending on the application, a retracted state can imply retracted to varying degrees. For example, depending on the need, meaning depending on the maximum permitted wingspan of an airport, the retracted position can lie between a slight lifting of the wing end pieces relative to the main wings on the one hand, and a complete deployment, meaning essentially a perpendicular arrangement of the wing end pieces relative to the main wing, on the other.

A wing according to the invention can here be further developed in such a way that at least one of the hinged devices is designed to absorb bending moments, with a torque vector running transverse to the longitudinal direction of the respective lever arrangement and transverse to the rotational axis of the respective lever arrangement. In other words, such a hinged device stabilizes the wing end piece structure relative to the main wing structure. In particular, the hinged device with such a configuration will hence achieve a torsional strength and flexural rigidity of the wing end piece relative to the main wing. This means that the wing end piece can move relative to the main wing in only a single degree of rotational freedom due to the configuration of at least one of the hinged devices according to the invention. In addition, at least one hinged device also safeguards against torsional or bending moments that act on the wing end piece, trying to twist or bend it out of this one degree of rotational freedom. The stability of a wing according to the invention is further increased in this way. A distinction must here be made between a deliberate degree of freedom for the pivoting motion of the wing end piece relative to the main wing, which is provided by releasing a degree of rotational freedom in a hinged device, and bending moments and torsional moments, which force a relative motion between the wing end piece and main wing, independently of potential degrees of rotational freedom in the hinged devices. In this case, such torsional moments and bending moments usually do not come about just during flight operations, meaning with the wing end piece in the deployed state, but also primarily during the pivoting process itself. Since the pivoting process is only performed in the simplest way using the lever kinematics as the path of force between the wing end piece and main wing, the pivoting motion is the most susceptible situation with respect to bending moments and torsional moments. As a result, further developing at least one of the hinged devices as described in the invention stabilizes the wing end piece during the pivoting motion, and makes it even easier to automate the pivoting process.

Essentially two basic ideas can be used to represent the configuration of at least one of the hinged devices so as to allow the absorption of bending moments or torsional moments. On the one hand, it is possible for the hinged device to involve a rotational bearing, which comprises a relatively long axial extension along the rotational axis. In particular rotational bearings are here to be used that comprise an axial extension of several times, in particular more than four times, their radial extension. This makes it possible to support bending moments of the kind described above. Alternatively or additionally, a hinged device can be configured out of more than a single hinge, for example out of two or more hinges designed as rotational bearings. These two or more rotational bearings are arranged in such a way that they together form a shared rotational axis, and can support bending moments of a lever arrangement from the one rotational bearing against the other because they are spaced apart from each other. The critical factor in such an embodiment is that the lever arrangement is rigidly secured with both rotational bearings, meaning that a coupling via the lever arrangement is present in a manner according to the invention. In such a case, the lever arrangement can here be designed as an H-rod, so that the lever arrangement according to the invention breaks up into two spaced apart levers, which are rigidly joined together by means of a central connecting web.

In addition, a wing according to the invention can advantageously comprise support means, which are designed in such a way as to form a force path in addition to the lever kinematics directly between the wing end piece structure and main wing structure with the wing end piece in a deployed state. In such a case, an additional stabilization of the wing according to the invention is achieved in the deployed state, meaning with the wing in flight operation. The second force path generates a hyperstatic mounting of the wing end piece on the main wing, in particular of the wing end piece structure on the main wing structure. Therefore, two force paths are provided, wherein loads that act on the wing end piece during flight operations can be dissipated both by the lever kinematics, and via the second force path formed by the support means. For example, such loads are air loads that act during flight operations, which can vary in magnitude and be oriented in different directions depending on the flight situation.

It must here be noted that the second force path can lead both to a partial and complete unloading of the lever kinematics. However, according to the invention, partially unloading the lever kinematics already provides an opportunity to design these lever kinematics to be even lighter, and hence more cost effective and even more efficient in terms of the power consumption of an aircraft. During loads encountered during flight operations, meaning with the wing end piece deployed, the primary load is hence transferred via the support means to the main wing structure. Since the two force paths involve parallel paths of force from a mechanical standpoint, there is no problem if the lever kinematics of the weaker parallel path are in this parallel force path. In other words, the second force path of the support means bridges the first force path of the lever kinematics. However, depending on the structural configuration of the support means, it is also possible to remove the lever kinematics completely as a force path, and have the support means constitute the sole force path. In this way, the lever kinematics can be configured exclusively for the acting loads during the pivoting process, saving on additional material thicknesses and hence on weight for the cruising flight operations of the wing.

According to the invention, the support means for a wing can comprise lugs along with depressions corresponding to the lugs. The lugs and depressions here are correspondingly situated relative to each other in the wing end piece structure and main wing structure in such a way that the lugs are removed from the depressions during retraction while executing the pivoting motion of the wing end piece, and introduced into the depressions during deployment while executing the pivoting motion of the wing end piece. In other words, the lugs descend into the depressions in the deployed state of the wing end piece, and are free of each other during the pivoting process and with the wing end piece in a retracted state.

In this way, the lowering of the lugs, meaning the introduction of the lugs into the depressions, serves to mechanically support the wing end piece, in particular the wing end piece structure on the main wing structure. These lugs can here transfer radial forces in the depressions. While the lugs can here be essentially cylindrical and/or conical in shape, other cross sectional forms are conceivable within the framework of the present invention, in particular polygonal cross sectional forms. The use of conical lugs is especially advantages when longer lugs are to be provided, thereby making it easier to thread the lugs into the depression.

A correlation of lugs that latch into depressions at the end of the pivoting process during deployment only becomes possible when using a wing according to the invention, in particular the lever kinematics. In known systems that perform pure folding motions, the folding motion exclusively involves rotation. It is not possible for purely axially extending lugs to move into depressions during the rotational motion. Jamming would take place, preventing the wing end piece from completely deploying. Only the configuration of the hinged device according to the invention and the combination of a rotational component and translational component during a pivoting process according to the invention achieved as a result even makes it possible to introduce lugs into depressions. It here makes no difference if the lugs in the wing end piece structure latch into depressions in the main wing structure or vice versa. A combination of both variants is also possible.

In cases where the lugs comprise a continuous collar supported against a continuous edge of the depressions, it is possible to have an axial force support in relation to the nose in addition to a radial force support. In this way, such support means fix the wing end piece structure on the main wing structure in all degrees of freedom save one. This last degree of freedom involves the lugs possibly moving out of the depression. This last degree of freedom can also be taken, for example, by providing a snap-latch attachment or some other mechanically detachable, i.e., reversibly generatable, connection between the lug and depression. As a result, the wing end piece structure would in such a case become completely locked to the main wing structure in the deployed state.

Hence, the support means in the form of lugs and depressions allow a transfer of forces in at least one, if not even several directions. Simple vector calculations, i.e., vector addition and vector subtraction, can be used to compute residual loads of acting air loads on the wing end piece as a function of the alignments, in particular the axial direction of the lugs and depressions, and the hence adjustable alignments of the possible force transfer directions. In this way, the air loads are at least partially dissipated via the support means. The residual force vector remaining after the subtraction of the load vector on the wing end piece and the transferable force components on the support means must be dissipated via the lever kinematics. It is this very residual quantity of forces yet to be dissipated that is substantially reduced, so that the lever kinematics can be made simpler, lighter and hence more cost effective and efficient in design.

It can further be advantageous for the support means to comprise corresponding stops on the respective main wing structure and wing end piece structure, which support each other with the wing end piece in the deployed state. Of course, such stops are additionally to be advantageously provided in a retracted state to enable a mounting independently of the lever kinematics of the wing end pieces in the retracted state. Such stops constitute an especially simple configuration of the support means in the deployed state. In particular in situations where pivoting does not involve an upward motion, as in most applications, but rather a downward motion, such a stop concept for the support means makes it easy to dissipate the main load, specifically the air load, which acts on the wing from the bottom up, and hence correlates directly with the lift force, and thus the weight force of the aircraft, via the stops of the support means.

While the stops have a disadvantage in comparison to the above support means in the form of lugs and depressions in that they can essentially only transfer force in a single force direction, they offer a major advantage in that stops permit contact over large areas, and hence large forces over large surfaces accompanied by a concurrent low surface pressure, in turn accompanied by a lower material load. The stops are here conceivable as both essentially flat surfaces, but also as contoured surfaces, which elevate the force transfer capabilities in several directions.

It is possible for the lever kinematics within the framework of the present invention to comprise a first joint and fourth joint in the main wing structure where hinged devices are provided in the form of rotational bearings. In addition, the lever kinematics in such an embodiment comprise a third joint and fifth joint in the wing end piece structure, at which hinged devices are also provided in the form of rotational bearings. The first lever arrangement here extends between the first joint and third joint, while the second lever arrangement extends between the fourth joint and fifth joint, and each are rotationally mounted in the respective rotational bearings. Let it be noted that, as already described further above, both the lever arrangement and hinged devices can extend over several planes. Hinged devices can have more than one rotational bearing, and lever arrangements more than one lever. However, all rotational bearings of a hinged device share in common that they have a joint rotational axis, meaning define a generally shared movement capacity. The individual levers of a lever arrangement share in common that they can rotate around joint rotational axes due to their configuration, which are defined by the two respective hinged devices. It here makes no difference whether the individual levers are rigidly joined with each other or not.

In particular, according to one embodiment of the wing according to the invention, the first lever arrangement comprises a first lever which is coupled to a first joint coupling the first lever with the main wing structure and to a third joint coupling the first lever with the main wing structure, and the second lever arrangement comprises a second lever which is coupled to a fourth joint coupling the second lever with the main wing structure and to a fifth joint coupling the second lever with the main wing structure.

According to another embodiment of the wing according to the invention, the wing can additionally comprise an actuator for actuating the lever kinematics in order to execute the pivoting motion of the wing end piece relative to the main wing, wherein the actuator is rotationally coupled by a sixth joint to the main wing structure or to the wing end piece structure and in that a part of the actuator lying in a distance from the sixth joint is rotationally mounted to the first and/or the second lever arrangement at a second joint being located in a distance from the respective first hinged device, wherein the actuator is designed to adjust the length between the second joint and the sixth joint.

According to another embodiment of the wing according to the invention, the wing can instead of the before-mentioned features or additionally comprise a rotary actuator comprising a main body being mounted on the main wing structure and comprising an actuator lever being coupled to the first and/or the second lever arrangement at a second joint being located in a distance from the respective first hinged device, so that the lever kinematics can be actuated on order to produce the pivoting motion of the wing end piece relative to the main wing.

The pivoting motion of the wing end piece is achieved by overlapping four rotational motions. The first lever arrangement rotates around the hinged device on the main wing structure side, while the wing end piece structure in turn rotates around the corresponding hinged device of the first lever arrangement. In like manner, the second lever arrangement rotates around the hinged device on the main wing structure side, while the wing end piece structure again rotates around the corresponding hinged device of the second lever arrangement. All four rotational motions together yield a complex pivoting motion of the wing end piece structure relative to the main wing structure.

It can further be advantageous if the wing according to the invention is provided with an actuator, which executes the pivoting motion of the wing end piece relative to the main wing via the lever kinematics, and is rotationally mounted in a sixth joint in the main wing structure having a rotational bearing. For example, such an actuator can be designed as a translational actuator, which is hydraulically, pneumatically, electrically or purely mechanically actuated in a known manner. However, it is alternatively conceivable to have embodiments in which the actuator is a rotational actuator, comprised in the simplest case of an electric motor. A combination of rotational mechanisms and translational mechanisms is also conceivable fro actuating the lever kinematics.

It can further be advantageous for the end of the actuator lying opposite the sixth joint to be rotationally mounted to the lever kinematics at a second joint separate from the four hinges of the lever kinematics. In other words, the second joint of the lever kinematics hence comprises another rotational bearing, between which and the rotational bearing in the sixth joint the actuation of the lever kinematics takes place. Given a translational actuator, the distance between the second and sixth joint is varied, so that the pivoting motion of the lever kinematics can be executed in the retraction direction or deployment direction. However, it is also possible for the second joint, meaning the joint where the actuator acts on the lever kinematics, to lie in one of the two hinged devices arranged in the wing end piece structure. However, actuation must always be prevented from taking place in one of the two hinged devices of the main wing structure. In such a case, no variation would be possible in the distance between the first or fourth joint on the one hand, and the sixth joint on the other, since all of these three joints are fixed in place in the main wing structure.

The working joint of actuation, meaning the second joint, in the lever kinematics must be selected in such a way that the resultant lever ratios that come about ensure that the actuation path, e.g., the rotational path or translational path, of the actuator is sufficiently small relative to the dimensions of the actuator on the one hand, and that the actuating force, meaning the force necessary to execute the pivoting process in both directions, also becomes as low as possible on the other. The above option is also only made possible by an arrangement of hinged devices in the form of a four-hinge kinematics as described in the invention. Only in such a case does a variation of the working joint of an actuator even become possible, and hence a variation in pivoting motion forces and the actuator path.

It can also be advantageous for the two lever arrangements in a wing according to the invention to be spaced apart from each other in the wing chord direction. In this case, the wing chord direction relates to the entire wing, meaning to a wing in which the wing end piece is in the deployed state. The advantage to spacing apart the two lever arrangements in the wing chord directions is that the lever kinematics as such can be divided into several parts without eliminating the functionality of the lever kinematics. This is advantageous in particular in cases involving tight space conditions in a region of the wing end piece structure and/or main wing structure. In particular, this makes it possible to achieve a design in which neither the wing end piece structure nor the main wing structure must be breached. As a consequence, a high stability of the wing end piece structure and main wing structure can be retained with the wing according to the invention, while the flexibility of the lever kinematics configuration still enables a pivoting motion of the wing end piece according to the invention despite this fact. Of course, it is here also possible for at least one of the lever arrangements to comprise separate levers, which also are spaced apart from each other in the wing chord direction. In one conceivable embodiment, for example, the second lever is arranged as a central H-rod inside the main wing structure, and two separated levers in the first lever arrangement are situated outside the main wing structure on the two opposing sides of the main wing structure. The main wing structure need not be breached, since the two separated levers of the first lever arrangements do not have to be joined together, and no connection is required between the first lever arrangement and second lever arrangement.

As already described above, it can be advantageous for at least one of the two lever arrangements to be designed as an H-rod, which extends in the wing chord direction. The configuration as an H-rod allows the lever arrangement to be broken up into two individual levers, which are joined with each other via a central web. This makes it possible to achieve the flexural strength, as has already been described above.

Another advantage to the present invention is for the wing end piece structure in a wing according to the invention to be expanded in the wingspan direction by means of at least one extension along the main wing structure. At the end of the extension in the wingspan direction of the wing end piece structure opposite the wing tip, one of the two hinged devices of the lever kinematics is here arranged on the wing end piece structure. Therefore, the extension lengthens the wing end piece structure, thereby generating a kind of intersection between the wing end piece structure and the main wing structure. This intersection can of course be provided repeatedly, i.e., in the form of more than one extension, and makes it possible to provide the lever kinematics with an even more favorable design with respect to the force and path ratios. One of the hinged devices in the wing end piece structure is here spaced as far apart as possible from the center of gravity of the wing end piece structure. The load of the corresponding hinged device is reduced in this way, based on the resultant leverage ratios. This embodiment of the invention shows yet again that arranging the hinged devices and lever arrangements according to the invention enables an advantageous adjustability of the force and leverage ratios during the pivoting process, the likes of which would not be possible using known systems with simple folding mechanisms.

It can also be advantageous within the framework of the present invention for at least one of the two lever arrangements of a wing according to the invention to be arranged in the wingspan direction between the extension of the wing end piece structure and the main wing structure. Another advantage can be achieved in a wing according to the invention by arranging at least one of the two lever arrangements inside the main wing structure. Therefore, the combination of the two above embodiments includes the placement of all lever arrangements in regions that do not exit a wing contour that envelops the respective main wing structure of wing end piece structure. As a result, the lever arrangements can be accommodated in a protected manner on the one hand, and are predictable in terms of wing aerodynamics in regions that do not impair the aerodynamics, meaning the outer contour of the wing, on the other.

Another advantage can be achieved by providing a wing according to the invention with a wing skin that defines the contour of the main wing. This contour of the main wing is advantageously the aerodynamic contour, which as the wing contour generates lift during the forward motion of the aircraft in flight. The wing skin has at least one opening designed in such a way that sections of the lever kinematics and/or wing end piece and/or wing end piece structure can move through the opening during the pivoting process of the wing end piece. As a result, the pivoting range of individual components in the lever kinematics, wing end piece or wing end piece structure can extend over the wing contour of the main wing.

It is here advantageous to provide each opening with at least one cover, which covers the respective opening with the wing end piece in the deployed state. The aerodynamic contour of the main wing is not disrupted by the presence of the openings when providing the covers in the deployed state, meaning in a flight situation. Nonetheless, the opening allows the wing end piece to freely pivot in the desired manner. As a result, lever kinematics according to the invention can also be combined with aerodynamically necessary or economically efficient wing geometries, in particular with respect to complex pivoting processes.

It can be advantageous for such a cover to automatically seal the opening as well. For example, this can be achieved by resiliently joining each cover with the wing end piece structure in such a way as to press the cover against the respective opening with the wing end piece in the deployed state. For example, the resilient configuration can be achieved by means of resilient elements, resilient plastics or spring elements. It is here advantageous to provide guiding means that limit the covers in their freedom of motion, so that they can exclusively move freely in one direction, and are pressed by the resilient connection in this one direction against the opening, for example against stops at the edge of the opening.

BRIEF DESCRIPTION OF THE DRAWINGS

The invention will be described in greater detail based on the exemplary embodiments on the following figures. In this case, the terms "left", "right", "top" and "bottom" all relate to the drawing figures, with an alignment having normal, legible reference numbers. Shown on:

FIG. 11 is another embodiment of support means.

DETAILED DESCRIPTION

In an exemplary embodiment of the invention, apparatus and methods described hereinabove are employed to perform a pivoting motion of the wing end piece relative to the main wing. The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. Specifically, features described in the context of a method can be used to characterize an apparatus and features described in the context of an apparatus can be used to characterize a method. The scope of the invention is limited only by the following claims. In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb. All publications and/or patents and/or product descriptions cited in this document are fully incorporated herein by reference to the same extent as if each had been individually incorporated herein by reference.

Figure 1A:
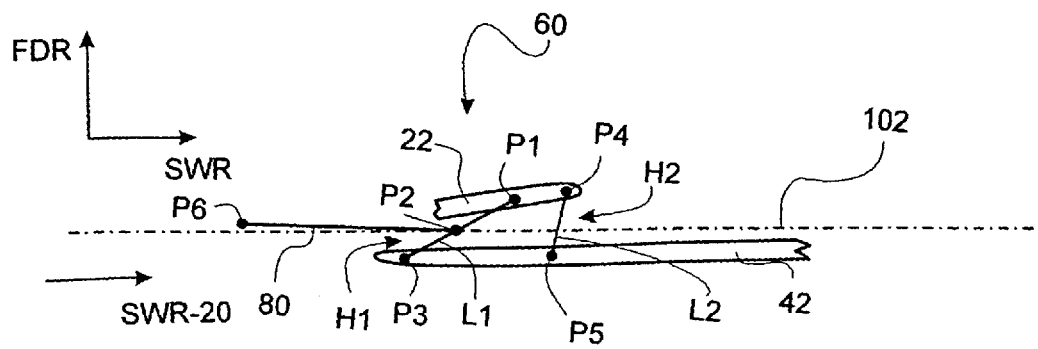
FIG. 1a is a diagrammatic view of lever kinematics according to the invention in a deployed state.
Figure 1B:
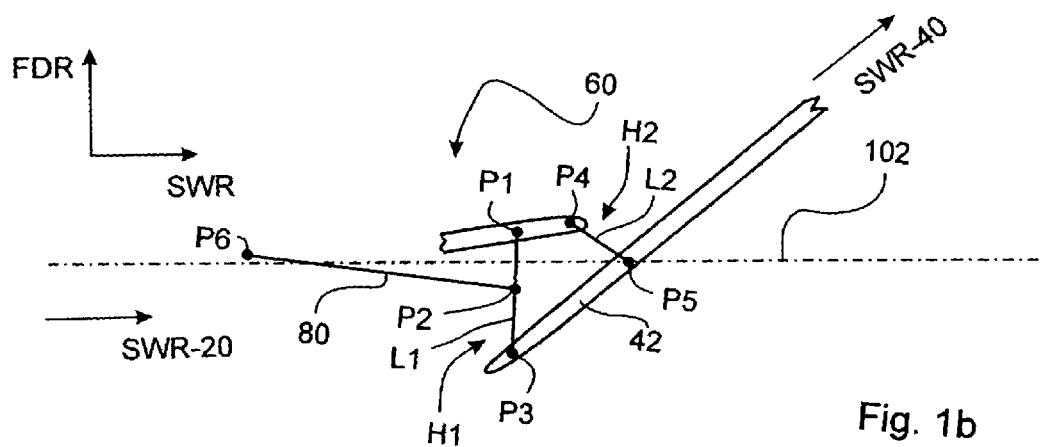
FIG. 1b are the lever kinematics according to the invention on FIG. 1a during the pivoting process, FIG. 1c are the lever kinematics according to the invention on FIGS. 1a and 1b in the retracted state.
Figure 1C:
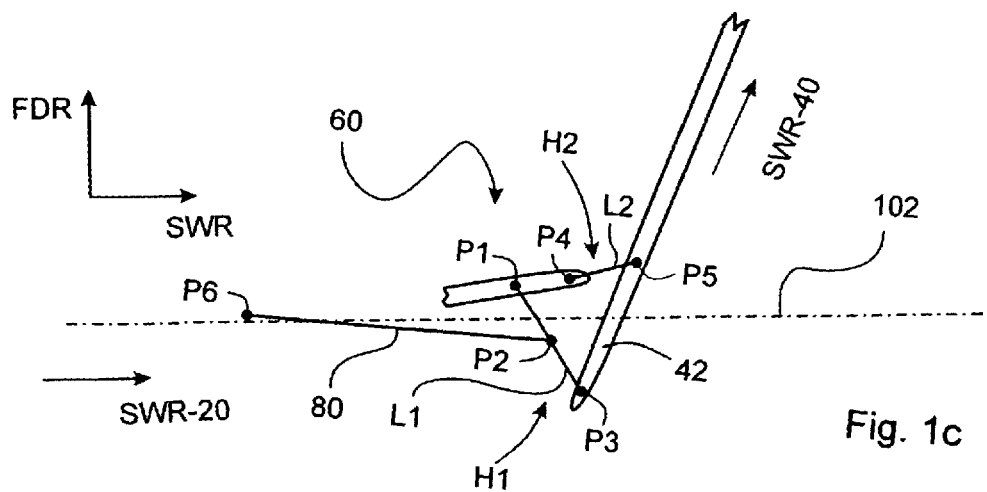

FIG. 1a to 1c will be used below to describe the basic function of the four-hinge kinematics of the lever kinematics 60. Reference number 102 here denotes the basic alignment of the wing 100, meaning the wing axis 102. The wing axis 102 here relates to the entire wing 100, meaning to the main wing 20 and wing end piece 40, with the wing end piece 40 in the deployed position.

The lever kinematics 60 is depicted in the deployed position on FIG. 1a. In this position, the wing end piece 40 hence extends along the wing axis 102. The arrangements of joints P1, P3, P4 and P5 are essential to the invention. These four joints denote the locations of the four-hinged devices, which comprise the four-hinge kinematics of the lever kinematics 60. Joints P1 and P4 are here the joints of the hinged devices 62, which are fixed in place relative to the main wing structure 22. Joints P3 and P5 denote the locations of the hinged devices 62, which are fixed in place relative to the wing end piece structure 42. A first lever arrangement H1 extends between joint P1 and P3, and a second lever arrangement H2 extends between joints P4 and P5. In this way, the two lever arrangements H1 and H2 couple the wing end piece structure 42 with the main wing structure 22.

Joints P2 and P6 are optional in terms of the invention, and depicted as an optional arrangement for an actuator 80. Joint P6 is also fixed in place relative to the main wing structure 22, while joint P2 is rigidly connected with the lever kinematics 60. Provided in both joints P2 and P6 is a respective rotational bearing, in which is supported an actuator 80 with a translatory action. By changing the distance between the two joints P2 and P6, the lever kinematics 60 can be set in motion, so that the pivoting process of the wing end piece 40 can be executed. It here makes no difference where joint P2 exactly lies, i.e., how the rotational bearing of the actuator 80 is arranged on the lever kinematics 60. The crucial factor is that joint P2 not coincide with joints P1 or P4. Depending on the arrangement of joint P2, which can be accommodated on lever arrangement H1, lever arrangement H2, as well as on one of joints P3 or P5, or even in a separate connection in the wing end piece structure 42, varying force ratios here come about during the pivoting process. However, the arrangement of joint P2 does not affect the pivoting motion itself.

If the distance between joints P2 and P6 is now changed, the actuator 80 shifts the lever H1 via its pressure joint on joint P2, moving it away from joint P6, and hence from the main wing structure 22. Lever H1 is now forced by the translational motion of joint P2 to execute a rotation around joint P1. Because joint P4 is also fixed in place in the main wing structure 22, and a lever connection is also present in joints P3 and P5 via the two lever arrangements H1 and H2 and the two hinged devices, lever H2 is also induced to rotate around the hinged device 62 in joint P4. The rotational motion of the two lever arrangements H1 and H2 alters the corresponding angles between the lever arrangements H1 and H2 with the wing end piece structure 42 having its vertexes in joints P3 and P5. In this way, the subsequent rotation of the wing end piece structure 42 is also accompanied by a translation of the wing end piece structure 42. The complexity of the pivoting motion can here be gleaned in particular from the angular changes of the respective lever arrangements relative to the wing end piece structure 42.

The pivoting motion concludes with the situation as shown on FIG. 1c, meaning in a position where the wing end piece structure is in the retracted state. In this case, the wing end piece structure 42 is not folded up completely, meaning at a 90° angle, but rather only retracted up to an acute angle between the wing end piece structure 42 and flight axis 102.

Increasing the distance between joints P6 and P2 even more would easily enable a further retraction, even an overlapping of the wing end piece structure 42. In an embodiment of the kind shown on FIGS. 1a to 1c, the end of the pivoting process is technically marked by the situation in which joints P1, P6 and P2 lie on a straight line. However, this state must be avoided, since the force required to pivot the wing end piece structure 42 out of this situation again becomes infinitely large due to the path and leverage ratios arising in this case.

Figure 2:
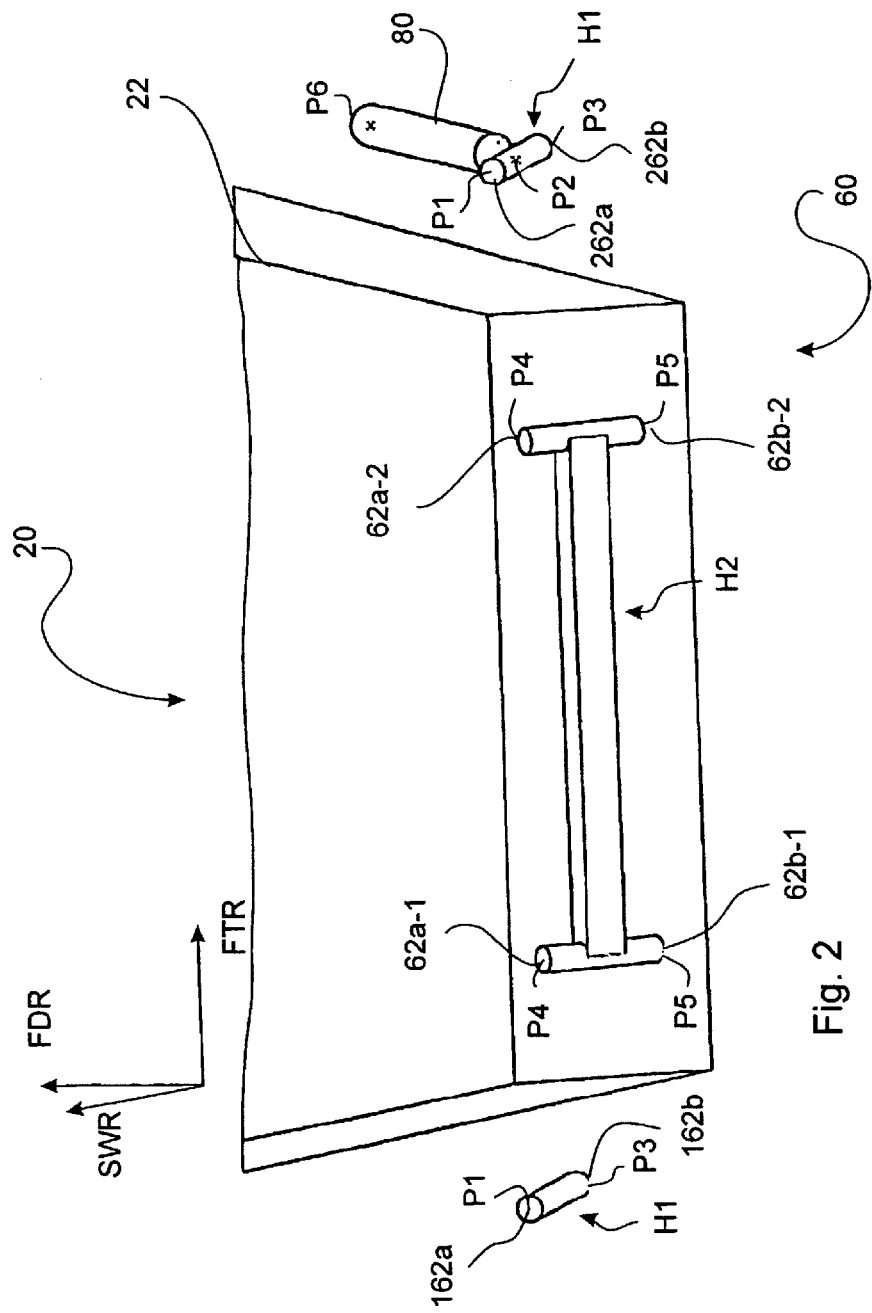
FIG. 2 is an isometric view of a main wing structure with lever arrangements situated therein.

FIG. 2 presents an embodiment isometrically depicting the main wing 20 and main wing structure 22 of a wing 10 according to the invention. The main wing structure 22 is here essentially square-shaped as the main wing box, wherein the second lever arrangement H2 is situated in the inner cavity of the main wing structure 22. The second lever arrangement H2 has a second lever arrangement H2 split in two, i.e., a second lever arrangement H2 with two levers. The two levers of the second lever arrangement H2 are spaced apart in the wing chord direction of the main wing 20, and joined together via a central transverse rod or even an H-rod, or a connecting web.

Both levers of the second lever arrangement H2 comprise a joint P4 and joint P5, in each of which a respective hinged device 62 is arranged in the form of a rotational bearing (not shown on FIG. 2). The rotational bearings arranged there are used for coupling the lever arrangement H2 with the main wing structure 22 at joints P4, and for coupling with the wing end piece structure 42 (not shown on. FIG. 2) at joints P5. Shown separately from the second lever arrangement H2 is a first lever arrangement H1, which also splits into two separate levers. However, the two levers in the first lever arrangement H1 are not structurally linked with each other, but rather are located outside the main wing structure 22 on the two opposing sides of this main wing structure 22. On the right side of FIG. 2, the lever of the first lever arrangement H1 is connected with an actuator 80, which extends between the two joints P2 and P6. The critical factor here is that no connection whatsoever has to exist between the individual levers of the first lever arrangement H1 as well as between the first lever arrangement H1 and second lever arrangement H2. Rather, it is sufficient to provide hinged devices 62, as described with joints P3 and P5 for coupling with the wing end piece structure 42, as well as hinged devices 62 in joints P1 and P4 for coupling with the main wing structure 22.

In particular, FIG. 2 shows: a main wing 20 with a supporting main wing structure 22, a wing end piece 40 with a supporting wing end piece structure 42, and a lever kinematics 60 for performing a pivoting motion of the wing end piece 40 relative to the main wing 20 between an extended state in which the wing end piece 40 and the main wing 20 form a continuous aerodynamic body and retracted state in which the wing end piece 40 is folded inward with regard to the main wing 20 from the extended state. The lever kinematics 60 can comprise: at least a first and a second lever arrangement H1, H2, which are mounted with a respective first hinged device 162a, 262a; 62a-1, 62a-2 on the main wing structure 22, and with a respective second hinged device 162b, 262b; 62b-1, 62b-2 on the wing end piece structure 42, wherein the second hinged device 162b, 262b of the first lever arrangement H1 and the second hinged device 62b-1, 62b-2 of the second lever arrangement H2 are offset in a wingspan direction SWR-40 of the wing end piece 40 with regard to each other, and the first hinged device 162a, 262a of the first lever arrangement H1 and the second hinged device 62a-1, 62a-2 of the second lever arrangement H2 are offset in a wingspan direction SWR-20 of the main wing 20 with regard to each other. As can be taken from FIG. 2, at least one of the hinged devices 162b, 262b; 62b-1, 62b-2; 162b, 262b; 62b-1, 62b-2 is designed in such a way that it can absorb bending moments, the torque vector of which runs transverse to the longitudinal direction of the effective lever arm of the respective lever arrangement H1, H2 and transverse to the rotational axis of the effective lever of the respective lever arrangement H1, H2.

According to an embodiment of the invention, the first lever arrangement H1 comprises a first lever L1 which is coupled to a first joint P1 coupling the first lever L1 with the main wing structure 22 and to a third joint P3 coupling the first lever L1 with the main wing structure 22, and the second lever arrangement H2 comprises a second lever L2 which is coupled to a fourth joint P4 coupling the second lever L2 with the main wing structure 22 and to a fifth joint P5 coupling the second lever L2 with the main wing structure 22.

Figure 3A:
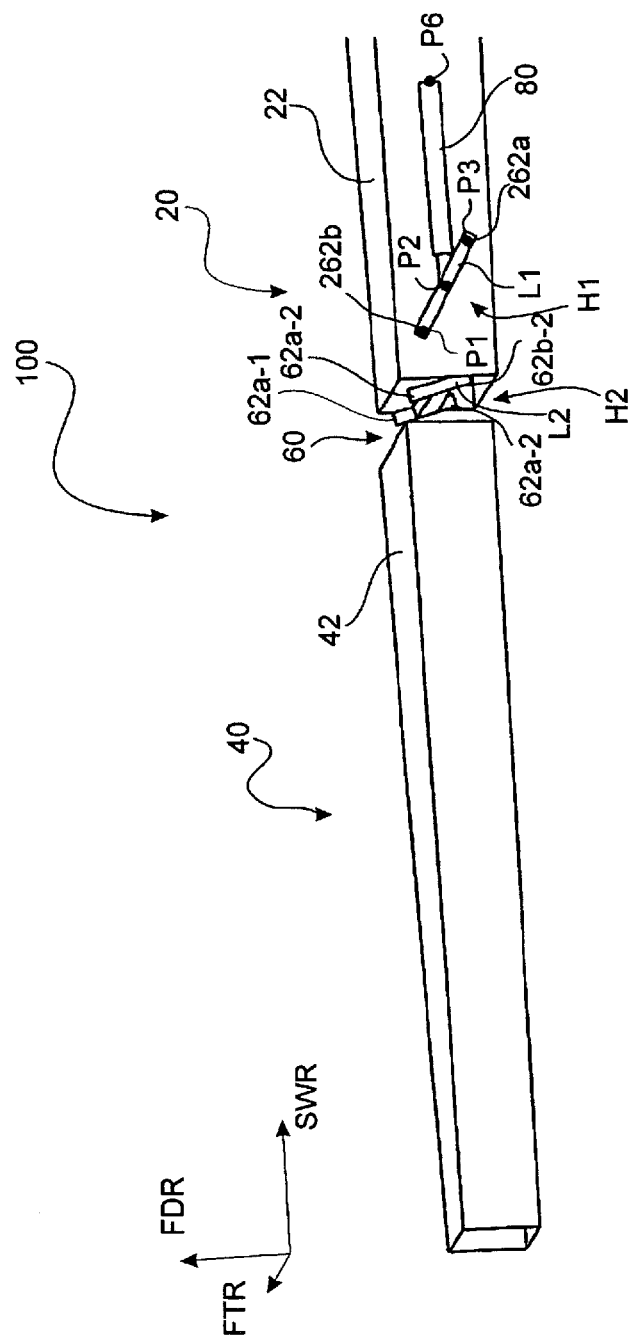
FIG. 3a is an isometric view of a wing with a wing box and a wing end piece box according to the invention, in which the coupling of levers to the wing box and a wing end piece box are not shown.
Figure 3B:
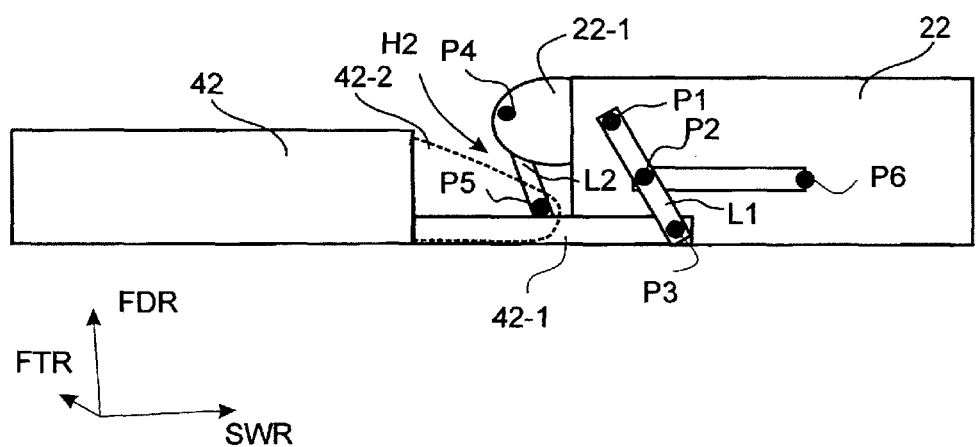
FIG. 3b is an isometric view of a wing with a wing box and a wing end piece box according to the invention, in which the coupling of levers to the wing box and a wing end piece box are shown by example.

As can be taken from FIG. 3b, the joint P5 can be coupled to a part or prolongation 42-2 of the wing end piece structure 42 for example in the form of a bracket or mounting. Also, the joint P3 can be coupled to a part or prolongation 42-1 of the wing end piece structure 42, also for example in the form of a bracket or mounting. As an example, the joint P4 can be coupled to a part or prolongation 22-1 of the main wing structure 22 for example in the form of a bracket or mounting.

The wing 100 can comprise an actuator 80 for actuating the lever kinematics 60 in order to execute the pivoting motion of the wing end piece 40 relative to the main wing 20, wherein the actuator 80 is rotationally coupled by a sixth joint P6 to the main wing structure 22 or to the wing end piece structure 42 and in that a part of the actuator 80 lying in a distance from the sixth joint P6 is rotationally mounted to the first and/or the second lever arrangement H1, H2 at a second joint P2 being located in a distance from the respective first hinged device 162a, 262a; 62a-1, 62a-2, wherein the actuator 80 is designed to adjust the length between the second joint P2 and the sixth joint P6.

In addition or alternatively, the wing 100 comprises a rotary actuator 80 comprising a main body being mounted on the main wing structure 22 and comprising an actuator lever being coupled to the first and/or the second lever arrangement H1, H2 at a second joint P2 being located in a distance from the respective first hinged device 162a, 262a; 62a-1, 62a-2, so that the lever kinematics 60 can be actuated on order to produce the pivoting motion of the wing end piece 40 relative to the main wing 20.

The kinematics extensively described in relation to FIG. 1a to 1c, in particular the pivoting motion achievable therewith, are also possible using lever arrangements H1 and H2 of the embodiment on FIG. 2, which are not linked with each other. Only the arrangement of the individual hinged devices 62 in joints P1, P3, P4 and P5 is critical here, wherein joints P3 and P4 and the hinged devices 62 arranged therein are spaced apart from each other in the wingspan direction SWR-40 of the wing end piece 40, and hinged devices 62 in joints P1 and P4 are spaced apart from each other in relation to the wingspan direction SWR-20 of the main wing 20. This enables a pivoting motion of the kind shown diagrammatically on FIG. 1a to 1c.

FIG. 3 shows an isometric view of the embodiment according to FIG. 2, but here also depicts the wing end piece 40 with its wing end piece structure 42. Because FIG. 3 is still an exploded view, the lever kinematics 60 are only shown diagrammatically. The hinged devices 62 are designed in particular as rotational bearings, and here also shown diagrammatically at the ends of the respective levers of the lever arrangements H1 and H2. It must be noted in particular that the respective hinged devices 62 as provided on FIG. 2 at joints P3 and P5, have not yet been connected with the wing end piece structure 42. Rather, linking must still take place to complete the lever kinematics 60 in terms of their functionality.

As readily discernible from FIG. 3, one key advantage to the lever kinematics 60 according to the invention here as well is that no breaches are required in the structures, meaning in the wing end piece structure 42 and main wing structure 22. Rather, the lever kinematics 60 function independently of a link between the individual lever arrangements H1 and H2.

Figure 4:
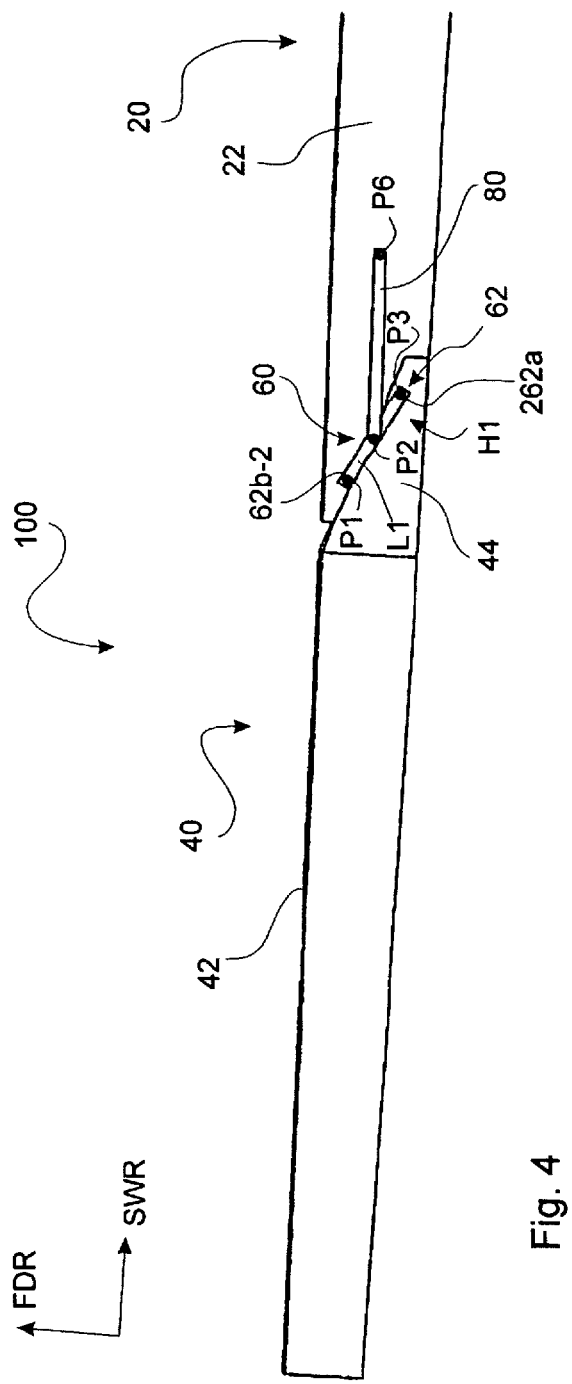
FIG. 4 is a side view of a wing according to the invention with extensions of the wing end piece structure.

FIG. 4 presents a side view of a further development of the embodiment according to FIG. 3. Provided here for joining the lever arrangement H1 with the wing end piece structure 42 is an extension 44, which lengthens the wing end piece structure 42 away from the wing tip of the wing end piece structure 40. This elongation spaces joint P3 as far as possible from the center of gravity of the wing end piece structure 42, thereby decreasing the loads within the hinged device 62 in joint P3 via the enlarged lever arm. In this case, the extension 44 is to be provided at least on one side of the wing 100, meaning on one side of the wing end piece structure 42, but can also be provided on other sides, in particular on the opposing side, as shown on FIG. 5, for example. Therefore, what results is a forked embodiment in which the wing end piece structure 42 of the wing end piece 40 at least partially envelops the main wing structure 20 of the main wing 20.

The embodiment according to FIG. 4 is further modified on FIG. 4, in that the extensions 44 are furnished with lugs 72, which comprise part of supporting means 70. These lugs 72 and how they function will be explained in greater detail based on the FIG. 7 to be described later.

Figure 5:
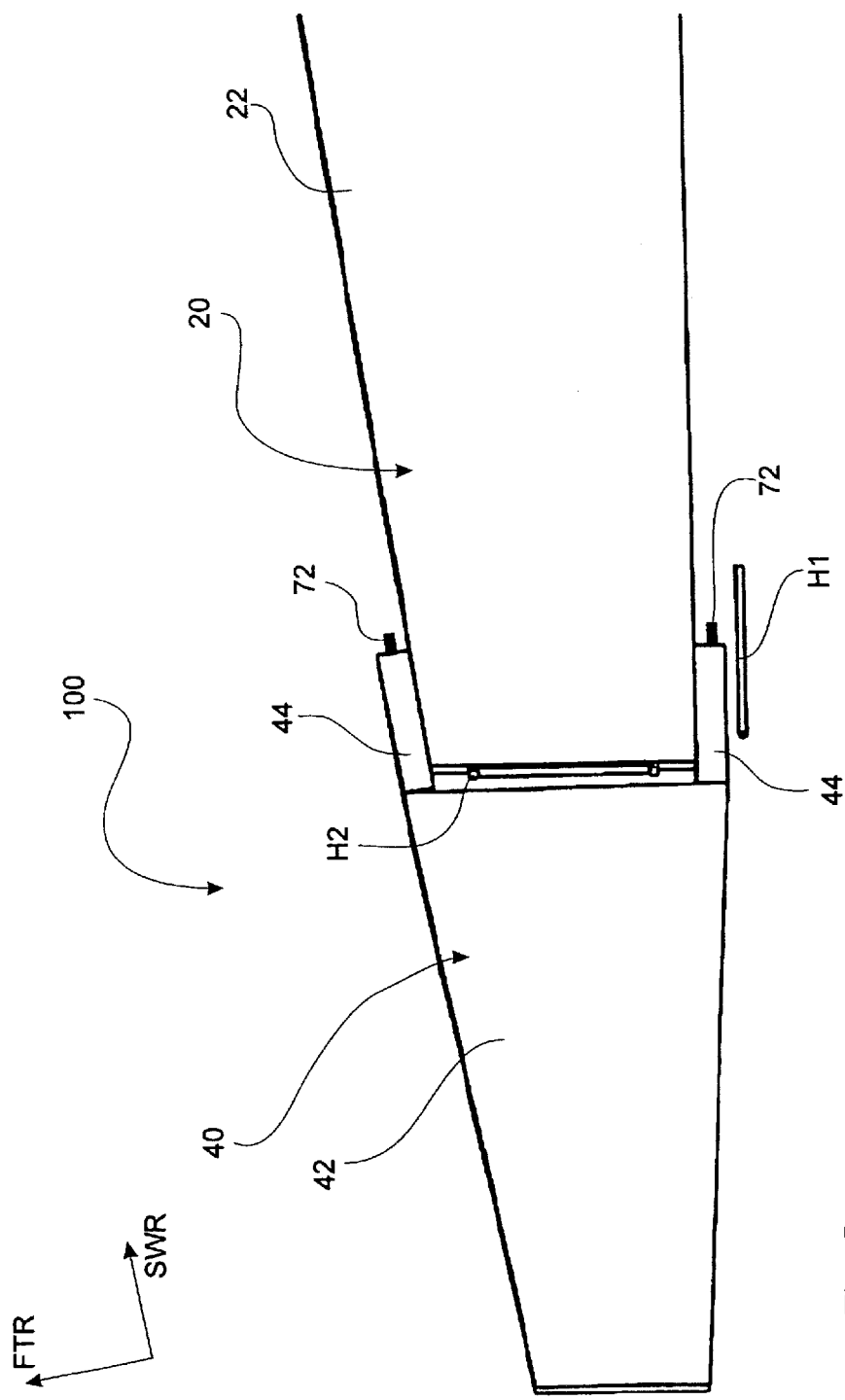
FIG. 5 is a top view of the embodiment according to FIG. 4 with small variations.

FIG. 5 also depicts the wing end piece structure 42, which is in the deployed state as well. The two lever arrangements H1 and H2 have here also been shown diagrammatically for the sake of clarity, leaving out in particular the arrangement and graphic depiction of the hinged device 62. The connection of the two lever arrangements H1 and H2 to the respective main wing structure 22 or wing end piece structure 42 can also not be gleaned from FIG. 5, since it is not shown for reasons of clarity. However, the embodiment according to FIG. 5 is also used to execute a pivoting motion, as has been explained in detail diagrammatically based on FIG. 1a to 1c.

Figure 6:
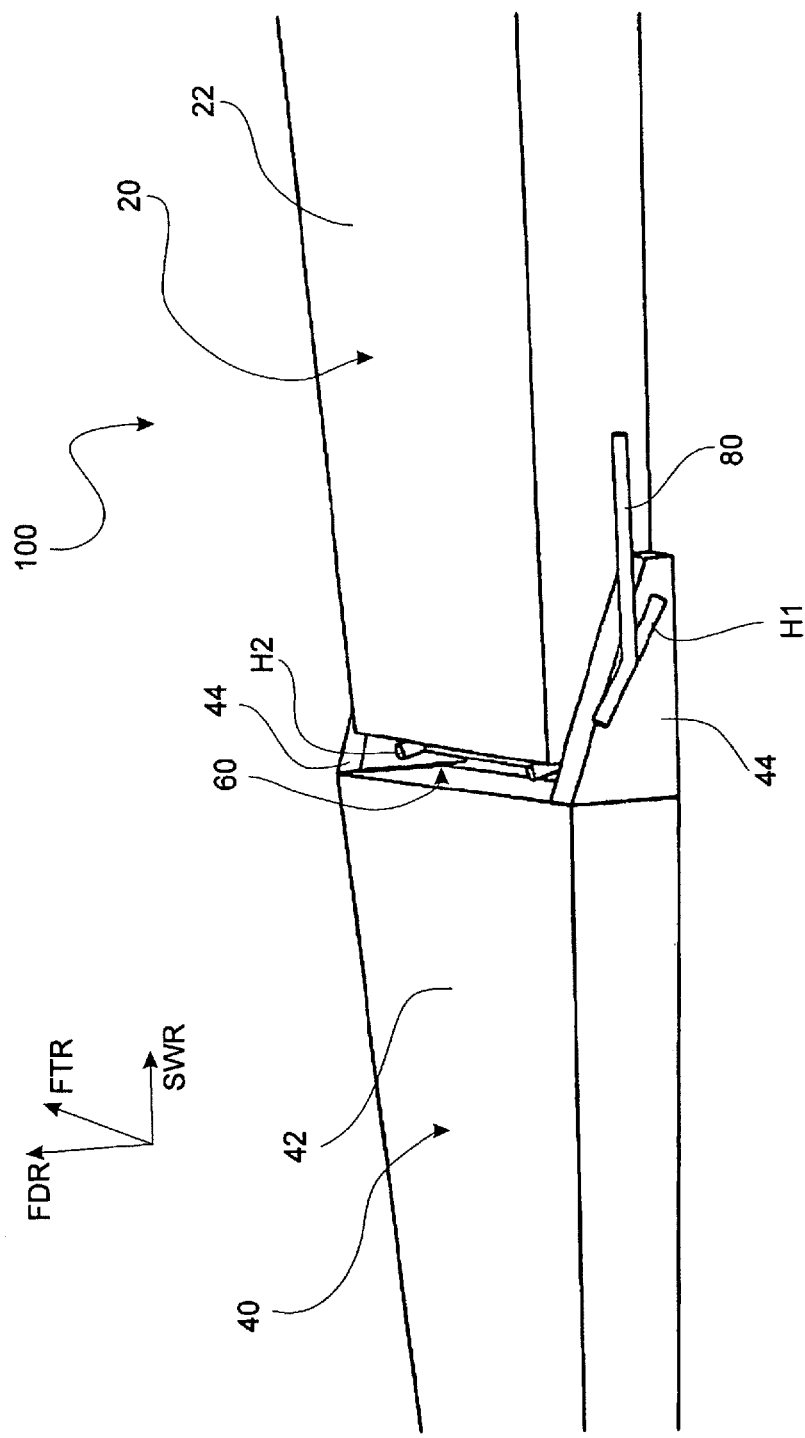
FIG. 6 is an isometric view of the embodiment according to FIG. 4.

FIG. 6 presents an isometric view of the embodiments on FIGS. 4 and 5, but without the lugs 72. As very readily discernible here, two extensions 44 extend along the outsides of the main wing 20, in particular its main wing structure 22, and envelop it like a fork, as it were. This makes sense in particular when another lever of the first lever arrangement H1 is situated on the opposing (rear on FIG. 6) side of the main wing structure 22, which establishes a coupling between the main wing structure 22 and wing end piece structure 42. In this case, the levers of the first lever arrangement H1 can lie both outside of the extensions 44, as well as between the extensions 44 and the outside of the main wing structure 22, contrary to the depictions on FIG. 6.

Figure 7:
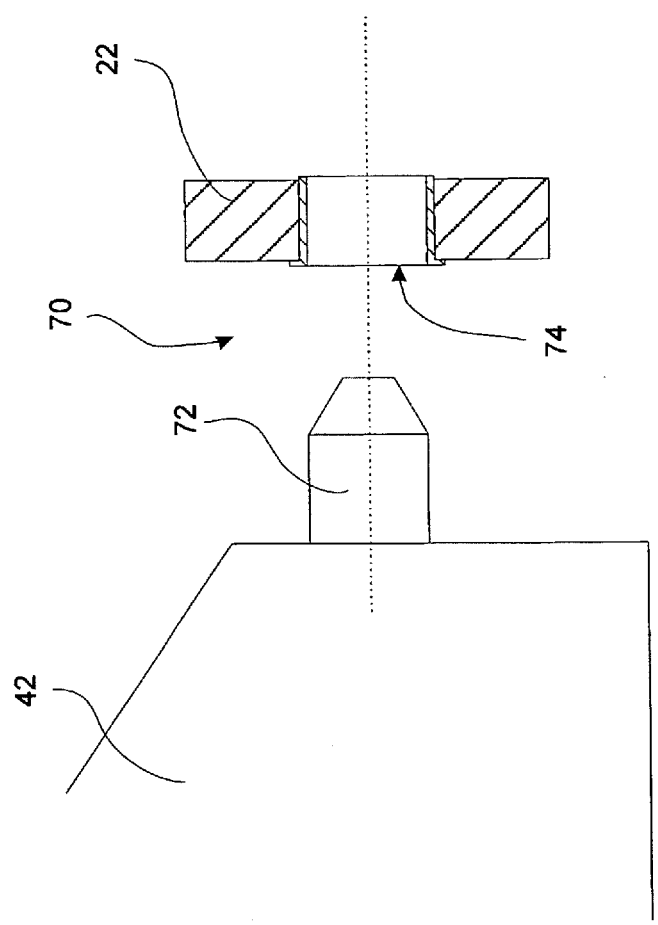
FIG. 7 is an embodiment of support means in the form of a lug and depression, FIG. 8 are directions of movement when supporting the support means according to FIG. 7.

FIG. 7 depicts an embodiment of a support means 70 according to the invention. The latter consists of a correlation of a lug 72 and depression 74. The depression 74 in this exemplary embodiment is provided in the main wing structure 22, while the lug 72 is provided on the wing end piece structure 42. Of course, kinematic reversal makes it possible to provide the depression 74 in the wing end piece structure 42 and the lug 72 on the main wing structure 22.

A dashed line shows the main axis of the lug 72, which in the embodiment according to FIG. 7 simultaneously represents the rotational axis of the lug 72, which is partially conical, and partially cylindrical in design. This main axis of the lug 72 runs congruently with the main axis of the depression 74, which has a round cross section. However, this must be regarded as an ideal case, which is enabled given a purely translatory motion of the wing end piece structure 42 relative to the main wing structure 22. However, since the motion in question involves a combination of rotation and translation, this ideal case will not arise. By having the lug 72 be at least partially conical, however, a rotational component of the pivoting motion can also be offset, as long as an adequate translatory component is present for introducing the lug 72 into the depression 74. A strictly rotational motion would only be possible if the conical head of the lug 72 were extremely large, or the selected clearance between the lug 72 and depression 74 were sufficiently large. In such a case, however, the transfer of force would not be ensured in the manner desired.

Tracing the main axis of the lug 72, we see that the lug 72 is introduced into the depression along this axis. The embodiment according to FIG. 7 here provides an inner bushing in the depression 74, which serves as a wearing part on the one hand, while being intended to ease the introduction and removal of the lug 72 into and out of the depression 74 through reduced friction. The distance, i.e., clearance, between the lug 72 and depression 74 is relatively slight. In particular, use can here be made of seats that permit the transfer of forces in a radial direction from the lug 72 to the depression 74, and hence to the main wing structure 22.

In addition, it can be advantageous for the wing end piece structure 42 on the depression 74 to hit its outer edge, so that axial forces in the pressure direction, meaning in the direction in which the lug 72 is being introduced, can be transferred from the wing end piece structure 42 to the main wing structure 22. In such a case, the only degree of freedom remaining after introducing the lug 72 into the depression 74 is the axial direction of removing the lug 72 from the depression 74. All other directions of force are covered, and can be used to transfer force from the wing end piece structure 42 to the main wing structure 22.

Figure 8:
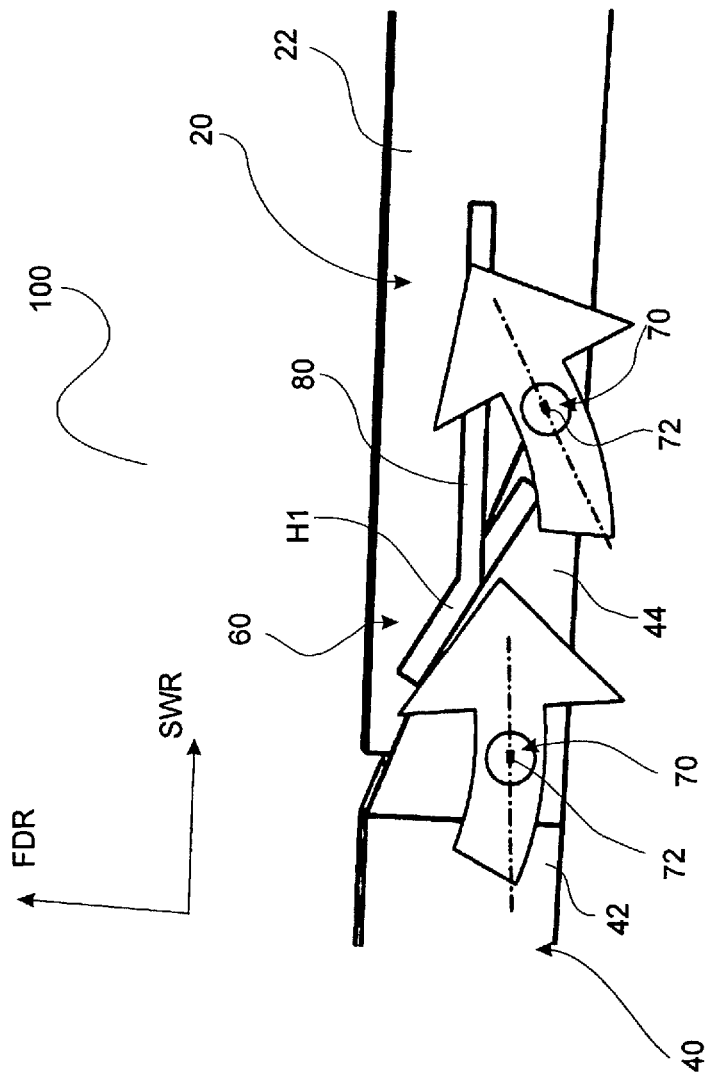

FIG. 8 again explains how the pivoting motion with rotational share and translational share is related to the alignment of the main axes of the support means, for example the lugs 72. In the embodiment according to FIG. 8, lugs 72 for support means 70 are placed at two different positions. The main axes of the respective lug 72 are not parallel to each other, but rather extend in an angular configuration relative to each other. The large arrows here denote the pivoting motions executed by the legs 72 rigidly secured to the wing end piece structure 42. These are the same pivoting motions performed by the wing end piece 40, and hence also the wing end piece structure 42 itself. As evident, these are not just pure rotational motions, but involve an overlapping of rotational and translational motions.

In the deployed state of the wing end piece 40, the main axis of the lugs 72 defines the primary direction of force transfer, for example which can be transferred via stops on the continuous edge of a depression 74 as depicted on FIG. 7. In situations where air loads act in the direction of the wing thickness direction FDR, for example, the latter can be broken down into components in the direction of the respective lug main axis of the lug 72 and a resultant component. In this case, the component jointing in the direction of the main axis of the lugs 72 can be transferred via the support means 70, while exclusively the remaining residual component must be supported by the lever kinematics 60, in particular by the actuator 80. In this way, the support means 70 relieve the lever kinematics 60, and above all the actuator 60, during cruising operations with the wing end piece 40 in the deployed state.

Figure 9:
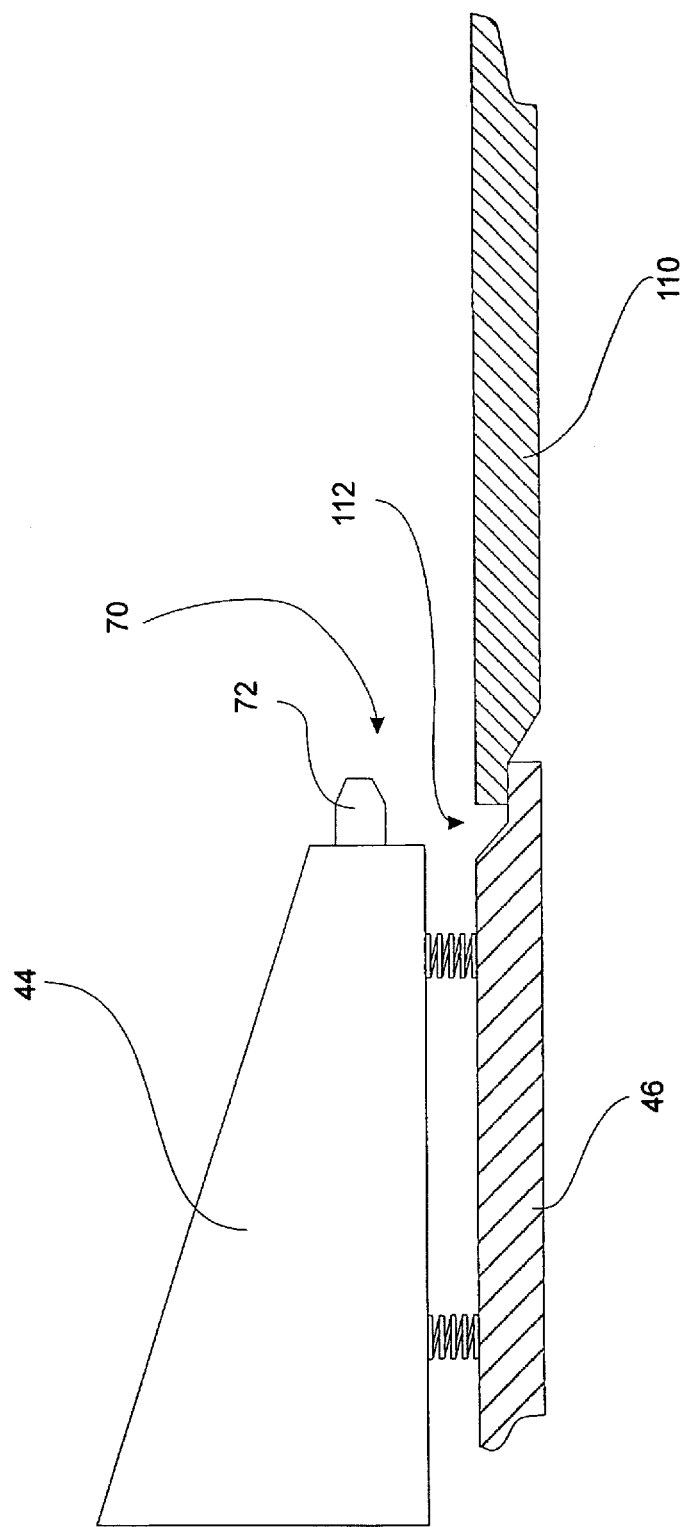
FIG. 9 is an embodiment of a cover according to the invention.

FIG. 9 depicts a possible embodiment for providing a cover 46 for openings 112 in the wing skin 110. Such openings 112 might become necessary if the pivoting range, for example as shown on FIG. 9, of an extension 44 of the wing end piece structure 42 projects out of the contour of a wing 100. As evident from FIG. 9, the extension 44 moves down in the case of deployment during the pivoting motion, and hence beyond the wing skin 110 that defines the contour. The extension 44 along with the lug 72 of the support means 17 must here exit the wing contour via the opening 112, and project out through the opening 112 during the pivoting process, and depending on the retracted situation, in the retracted state as well. In order to ensure that the most advantageous situation possible is achieved during cruising operation, a cover 46 is provided on the extension 44 via elastic connections depicted as springs. The cover along with a stop is pressed via the elastic connections in the form of springs against a corresponding stop of the wing skin 110, so that the opening 112 is essentially continuously covered in the deployed state of the wing end piece 40, with the contour of the wing 100 being interrupted as little as possible. In this way, a complex pivoting motion extending in particular beyond the contour of the wing 100 can be combined with an advantageous aerodynamic wing geometry.

Figure 10:
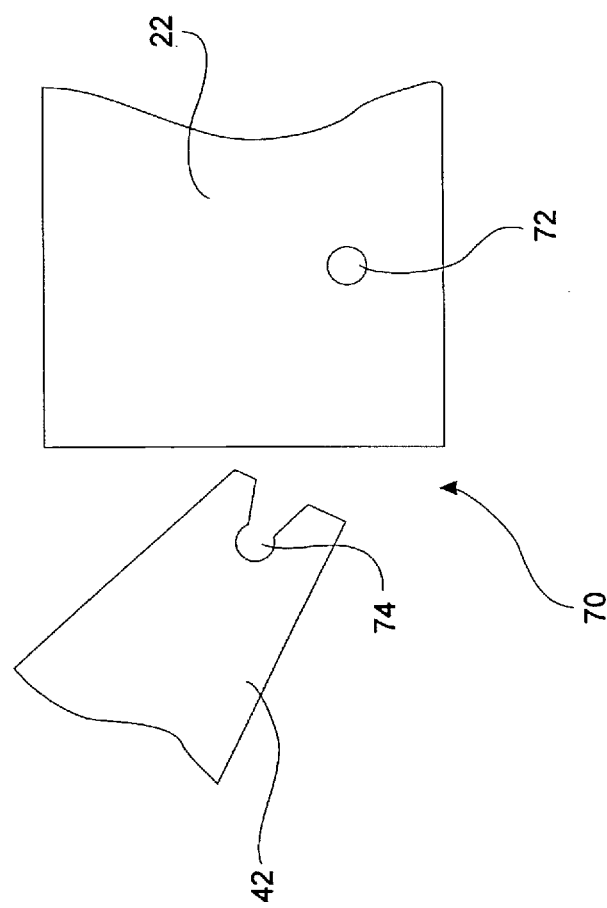
FIG. 10 is another embodiment of support means.

FIG. 10 shows another embodiment of support means 70 for a main wing 20 according to the invention. In this embodiment, the arrangement of lugs 72 and depressions 74 was switched in relation to the respective structure 42 and 22 in comparison to the embodiment on FIG. 7. Consequently, the depressions 74 are here provided in the wing end piece structure 42, and the lugs 72 in the main wing structure 22. The alignment of the two elements lug 72 and depression 74 is also altered. The main axis of the lug 72 now no longer prescribes the support direction. Rather, the depression 74 is here the movable part of the support means 70.

The latter can additionally be designed in such a way that it can latch with the lug 72, as depicted on FIG. 10. To this end, the opening of the depression 74 through which the lug 72 can enter the depression is provided with two diagonals, the distance between which diminishes toward the depression 74. The minimal distance of the two diagonals, which can also be referred to as introduction aids, is here at least somewhat smaller than the maximum radial extension of the lug 72 in the region intended to incorporate the depression 74. In this way, the diagonals serve to force apart to some extent the respective section of the wing end piece structure 42 lying behind them, so that the lug 72 can enter into the depression 74. As soon as the lug 72 has been incorporated in the depression 74, the diagonals again snap back into the position shown on FIG. 10. The material behind the diagonals is essentially relieved, and this snap-latch connection secures the lug 72 against moving out of the depression 74 within at least a specific range of forces. If a detachment force exceeds this range of forces, for example due to the retraction of the wing end piece structure 42, the material behind the diagonals is again forced apart, and the lug 72 can exit the depression 74.

FIG. 11 shows another alternative embodiment of support means 70. These are very similar to the embodiment according to FIG. 7. However, the lug 72 is here not split into a cylindrical and conical region, but is rather convexly curved via its axial extension. In a special embodiment, the jacket surface of the lug 72 can at least partially comprise the shape of an ellipsoid in the curved region, the ends of which are formed by two circular surfaces. The curvature of the lug 72 here advantageously reflects the alignment of the introduction line, which does not run along a straight line, but rather along a curved line via rotation and translation of the wing end piece structure 42. This makes it possible to further improve the introduction of the lug 72 into the depression 74, since the constant curvature provides no shoulder in the lug 72 that might become hooked or jammed.

REFERENCE LIST

20 Main wing
22 Main wing structure
40 Wing end piece
42 Wing end piece structure
44 Extension
46 Cover
60 Lever kinematics
62 Hinged device
70 Support means
72 Lug
74 Depression
80 Actuator
100 Wing
102 Wing axis
110 Wing skin
112 Opening
P1 First joint
P2 Second joint
P3 Third joint
P4 Fourth joint
P5 Fifth joint
P6 Sixth joint
H1 First lever of lever kinematics
H2 Second lever of lever kinematics
FTR Wing chord direction
FDR Wing thickness direction
SWR Wingspan direction
SWR-20 Wingspan direction of main wing
SWR-40 Wingspan direction of wing end piece

The invention claimed is:

1. A wing for use in an aircraft, the wing comprising:
a main wing with a supporting main wing structure;
a wing end piece with a supporting wing end piece structure; and
lever kinematics for performing a pivoting motion of the wing end piece relative to the main wing between an extended state in which the wing end piece and the main wing form a continuous aerodynamic body and a retracted state in which the wing end piece is folded inward with regard to the main wing from the extended state, the lever kinematics comprising:
at least a first and a second lever arrangement, which are mounted with a respective first hinged device on the main wing structure, and with a respective second hinged device on the wing end piece structure, each hinged device forming a rotational axis,
wherein the second hinged device of the first lever arrangement and the second hinged device of the second lever arrangement are offset in a wingspan direction of the wing end piece with regard to each other, and the first hinged device of the first lever arrangement and the second hinged device of the second lever arrangement are offset in a wingspan direction of the main wing with regard to each other;
wherein the wing end piece structure is expanded in a wingspan direction by at least one extension along the main wing structure, at the end of which, in the wingspan direction of the wing end piece structure opposite a wing tip of the wing, one of the two hinged devices of the lever kinematics being arranged on the wing end piece structure; and
wherein the at least one extension lengthens the wing end piece structure, thereby generating an intersection between the wing end piece structure and the main wing structure.

2. The wing according to claim 1, wherein at least one of the hinged devices is designed in such a way that it absorbs bending moments, a torque vector of which runs transverse to a longitudinal direction of an effective lever arm of the respective lever arrangement and transverse to a rotational axis of an effective lever arm of the respective lever arrangement.

3. The wing according to claim 1, wherein supports are provided, which are designed in such a way as to form a force path in addition to the lever kinematics directly between the wing end piece structure and the main wing structure with the wing end piece in a deployed state.

4. The wing according to claim 3, wherein the supports comprise lugs, and depressions corresponding to the lugs, which are correspondingly situated relative to each other in the wing end piece structure and the main wing structure in such a way that the lugs are removed from the depressions while executing the pivoting motion of the wing end piece in the retraction process, and introduced into the depressions during deployment while executing the pivoting motion of the wing end piece.

5. The wing according to one of claim 3, wherein the supports comprise corresponding stops on the respective main wing structure and the wing end piece structure, which support each other with the wing end piece in the deployed state.

6. The wing according to claim 1, wherein
the first lever arrangement comprises a first lever which is coupled to a first joint coupling the first lever with the main wing structure and to a third joint coupling the first lever with the main wing structure, and
the second lever arrangement comprises a second lever which is coupled to a fourth joint coupling the second lever with the main wing structure and to a fifth joint coupling the second lever with the main wing structure.

7. The wing according to claim 1, wherein the wing comprises an actuator for actuating the lever kinematics in order to execute the pivoting motion of the wing end piece relative to the main wing, wherein the actuator is rotationally coupled by a sixth joint to the main wing structure or to the wing end piece structure and in that a part of the actuator lying in a distance from the sixth joint is rotationally mounted to the first and/or the second lever arrangement at a second joint being located in a distance from the respective first hinged device, wherein the actuator is designed to adjust a length between the second joint and the sixth joint.

8. The wing according to claim 1, wherein the wing comprises a rotary actuator comprising a main body being mounted on the main wing structure and an actuator lever being coupled to the first and/or the second lever arrangement at a second joint being located in a distance from the respective first hinged device, so that the lever kinematics can be actuated in order to produce the pivoting motion of the wing end piece relative to the main wing.

9. The wing according to claim 1, wherein the two lever arrangements are spaced apart from each other in a wing chord direction.

10. The wing according to claim 1, wherein at least one of the two lever arrangements is designed as an H-rod, which extends in a wing chord direction.

11. The wing according to claim 1, wherein at least one of the two lever arrangements is arranged in the wingspan direction between the at least one extension of the wing end piece structure and the main wing structure.

12. The wing according to claim 1, wherein at least one of the two lever arrangements is arranged inside the main wing structure.

13. The wing according to claim 1, wherein a wing skin is provided that defines a contour of the main wing, which has at least one opening designed in such a way that sections of the lever kinematics and/or wing end piece and/or wing end piece structure during the pivoting motion of the wing end piece, and further that at least one cover is provided for each opening, which covers the respective opening with the wing end piece in a deployed state.

14. The wing according to claim 13, wherein each cover is resiliently joined with the wing end piece structure in such a way as to press the cover against the respective opening with the wing end piece in the deployed state.

* * * * *